(12) United States Patent
Gagliardi et al.

(10) Patent No.: US 8,003,235 B2
(45) Date of Patent: Aug. 23, 2011

(54) COATED GLASS PANE (75) Inventors: Giovanni Gagliardi, Vasto (IT); Marco Ronci, San Salvo Marina (IT); David Alistair Wood, Warrington (GB); John Robert Siddle, Southport (GB)

(73) Assignees: Pilkington Group Limited, Merseyside (GB); Pilkington Italia S.p.A., San Salvo (Chieti) (IT)

( * ) Notice: Subject to any disclaimer, the term of this patent is extended or adjusted under 35 U.S.C. 154(b) by 58 days.

(21) Appl. No.: 12/295,409

(22) PCT Filed: Mar. 30, 2007

(86) PCT No.: PCT/EP2007/053116
§ 371 (c)(1),
(2), (4) Date: Nov. 3, 2008

(87) PCT Pub. No.: WO2007/113259
PCT Pub. Date: Oct. 11, 2007

(65) Prior Publication Data
US 2009/0047509 A1 Feb. 19, 2009

(30) Foreign Application Priority Data
Mar. 31, 2006 (IT) .............................. RM2006A0181

(51) Int. Cl.
*B32B 9/04* (2006.01)
*B32B 9/00* (2006.01)
*C03C 17/00* (2006.01)

(52) U.S. Cl. ........ 428/704; 428/428; 428/432; 428/689; 428/699; 428/697; 428/701; 428/702; 65/60.2; 65/95

(58) Field of Classification Search .................. 428/428, 428/432, 689, 699, 697, 701, 702, 704; 65/60.2, 65/95
See application file for complete search history.

(56) References Cited

U.S. PATENT DOCUMENTS

| 4,806,220 | A  | 2/1989  | Finley          |
|-----------|----|---------|-----------------|
| 4,894,290 | A  | 1/1990  | Chesworth et al.|
| 4,919,778 | A  | 4/1990  | Dietrich et al. |
| 5,059,295 | A  | 10/1991 | Finley          |
| 5,935,702 | A  | 8/1999  | Macquart et al. |
| 6,398,925 | B1 | 6/2002  | Arbab et al.    |

(Continued)

FOREIGN PATENT DOCUMENTS
CN        1671632 A    9/2005
(Continued)

OTHER PUBLICATIONS

International Search Report for corresponding application PCT/EP2007/053116, completed Dec. 7, 2007.

(Continued)

*Primary Examiner* — Gwendolyn Blackwell
(74) *Attorney, Agent, or Firm* — Buchanan Ingersoll & Rooney PC (57) ABSTRACT

The invention relates to a coated glass pane with a low-e and/or solar control coating comprising at least one layer sequence which comprises at least the following transparent layers:
  a lower anti-reflection layer,
  an IR-reflecting layer,
  an upper anti-reflection layer.
At least one of the anti-reflection layers comprises at least one compound layer containing a mixture of an (oxy)nitride of Si and/or Al and of ZnO. The inventive coated glass panes are preferably heat treatable, e.g. toughenable and/or bendable.

36 Claims, 6 Drawing Sheets

U.S. PATENT DOCUMENTS

| | | | |
|---|---|---|---|
| 6,451,434 B1 * | 9/2002 | Ebisawa et al. | 428/432 |
| 6,503,636 B1 | 1/2003 | Le Masson et al. | |
| 6,833,194 B1 | 12/2004 | O'Shaughnessy | |
| 6,919,133 B2 | 7/2005 | Hartig et al. | |
| 7,192,647 B2 | 3/2007 | Hartig | |
| 7,192,648 B2 | 3/2007 | Hartig et al. | |
| 7,413,768 B2 | 8/2008 | O'Shaughnessy | |
| 7,431,808 B2 | 10/2008 | Schultheis et al. | |
| 2004/0086723 A1 | 5/2004 | Thomsen et al. | |
| 2004/0137235 A1 | 7/2004 | Paul et al. | |
| 2006/0078747 A1 | 4/2006 | Novis et al. | |
| 2006/0246300 A1 | 11/2006 | Hevesi | |
| 2008/0085404 A1 | 4/2008 | Novis et al. | |

FOREIGN PATENT DOCUMENTS

| | | | |
|---|---|---|---|
| CN | 1747907 A | | 3/2006 |
| DE | 198 08 795 A1 | | 9/1999 |
| EP | 0 229 921 A1 | | 7/1987 |
| EP | 0 233 003 A1 | | 8/1987 |
| EP | 0 275 474 B1 | | 12/1987 |
| EP | 0 718 250 A2 | | 6/1996 |
| EP | 0 761 618 A1 | | 3/1997 |
| EP | 1 284 302 A1 | | 2/2003 |
| EP | 1 498 397 A1 | | 1/2005 |
| WO | WO 99/64362 A2 | | 12/1999 |
| WO | WO 00/37384 A1 | | 6/2000 |
| WO | WO 00/76930 A1 | | 12/2000 |
| WO | WO 02/076901 A1 | | 10/2002 |
| WO | WO 03/074442 A1 | | 9/2003 |
| WO | WO 2005/0030498 | | 1/2005 |
| WO | WO 2005/012200 A1 | | 2/2005 |

OTHER PUBLICATIONS

Chinese Office Action issued Nov. 19, 2010 by the State Intellectual Property Office of the People's Republic China in Chinese Patent Application No. 200780016389.7 and English language translation of Chinese Official Action.

* cited by examiner

COATED GLASS PANE

The invention relates to coated glass panes with a low-e and/or solar control coating. Such visibly transparent coatings are well known in the art and generally comprise at least one IR-reflecting layer which is embedded between transparent lower and upper dielectric anti-reflection layers.

There is an increasing need for such coated glass panes being heat treatable. Heat treated glass panes which are toughened to impart safety properties and/or are bent are required for a large number of areas of application, e.g. for architectural or motor vehicle glazings. It is known that for thermally toughening and/or bending glass panes it is necessary to process the glass panes by a heat treatment at temperatures near or above the softening point of the glass used and then either to toughen them by rapid cooling or to bend them with the aid of bending means. The relevant temperature range for standard float glass of the soda lime silica type is typically about 580-690° C., the glass panes being kept in this temperature range for up to several minutes before initiating the actual toughening and/or bending process.

The terms "heat treatment", "heat treated" and "heat treatable" in the following description and in the claims refer to thermal bending and/or toughening processes such as mentioned before and to other thermal processes during which a coated glass pane reaches temperatures in the range of about 580-690° C. for a period of up to several minutes.

Difficulties can arise if these glass panes are provided with coatings, particularly with coatings comprising at least one silver-based IR-reflecting layer, e.g. to impart solar control and/or low-e properties to reduce the energy transfer through the coated glass pane in certain spectral regions. Such coatings are not of themselves heat treatable.

A number of proposals have been made in the past how to provide visibly transparent coatings with at least one IR-reflecting layer which can be applied to flat glass panes and subsequently be subjected to a heat treatment without damaging the coating and specifically the IR-reflecting layer. It has been particularly aimed at providing coatings which modify their optical properties only slightly during a heat treatment.

To achieve heat treatability of the coated glass pane the layers below and above the IR-reflecting layer(s) need to be carefully chosen. It is known to use layers which are able to protect the IR-reflecting layer(s) during the heat treatment, e.g. by providing a barrier or capturing/absorbing function for oxygen which diffuses through the coating to the IR-reflecting layer(s) and/or a barrier function against the diffusion of components of the coating or of the glass substrate, by stabilizing the IR-reflecting layer(s) against agglomeration or by other means.

Such functions may be provided by adding thin auxiliary layers to the coating such as disclosed in, e.g., EP 0 233 003 A1, EP 0 229 921 A1, EP 0 761 618 A1, EP 1 089 947 A1, EP 1 140 721 A1, EP 1 385 798 A1, to mention only some publications.

Other proposals to provide heat treatability of low-e and/or solar control coatings teach to choose carefully the materials for the anti-reflection layers such that they provide the functions mentioned before more or less by themselves. It has specifically been proposed to use (oxy)nitrides of silicon and/or aluminium or specified silicon compounds having a barrier function as anti-reflection layers or at least as their major parts (for example EP 0 718 250 B1), (oxy)nitrides here and in the following encompassing both oxynitrides and essentially oxygen-free nitrides.

It has furthermore been proposed to use Zn—Sn oxide (e.g. zinc stannate) for the anti-reflection layers of heat treatable coatings, see for example EP 1 140 721 B1, WO 00/76930 A1, EP 0 275 474 B 1.

The inventors of the instant invention found that several of the coated glass panes described hereinbefore did not withstand one or the other test simulating ordinary environmental influences during storage, transport and use of the coated glass panes before and after a heat treatment and the mechanical and chemical conditions acting on the coated glass panes during usual handling and processing steps. Certain of the known coatings showed such a high fault level after heat treatments that they were unacceptable for use in most automotive or building applications.

It was specifically found that coatings with Zn—Sn oxide anti-reflection layers developed comparably high haze values during heat treatments at temperatures above 650° C., whereas coatings with Si (oxy)nitride anti-reflection layers showed a less than desirable robustness against mechanical and chemical influences.

The invention primarily aims to provide coated glass panes such as described hereinbefore which display good low-e and/or solar control performance, high light transmittance, low haze and high mechanical and chemical robustness.

In certain embodiments the inventive low-e and/or solar control coatings should, optionally after a heat treatment, provide of a low sheet resistance while at the same time displaying high light transmittance ($T_L$) and low haze values.

The inventive low-e and/or solar control coatings should preferably at least in some embodiments be heat treatable and display low haze values after a heat treatment. More specifically certain of the coated glass panes according to the invention should be heat treatable without major modifications of their optical properties, particularly of their light transmittance and/or their reflection colour.

The coated glass panes should furthermore withstand ordinary environmental influences during storage, transport and use of the coated glass panes both before and after a heat treatment and survive the mechanical and chemical conditions acting on the coated glass panes during usual handling and processing steps without significant damage.

The invention furthermore aims to provide heat treatable coated glass panes with a high light transmittance and a low emissivity (corresponding to a low sheet resistance) and/or with good solar control properties, i.e. low solar energy transmittance combined with high light transmittance.

The invention more specifically aims to provide low-e and/or solar control coatings with improved properties compared to coatings using primarily silicon nitride in their anti-reflection layers.

It was surprisingly found that low-e and/or solar control coatings having a superior mechanical and chemical durability, which in some embodiments are heat treatable, can be provided if at least one of the anti-reflection layers of the coatings comprises at least one compound layer containing a mixture of an (oxy)nitride of Si and/or Al and of ZnO. It will be appreciated that such mixture may take different forms on the microscopic level. In the context of the invention a layer is a compound layer in its broadest meaning if atoms of Si and/or Al, Zn, O and N are detectable in the layer independent of how they are bound to each other on the microscopic level. It is however assumed that in most practical embodiments the inventive compound layer actually comprises microscopically a mixture of the actual compounds (oxy)nitride of Si and/or Al on the one hand and ZnO on the other.

According to a first embodiment of the invention the compound layer is an essentially homogeneous layer. Such an essentially homogeneous layer may for example be achieved by sputter deposition of the compound layer from a mixed target comprising a mixture of Si and/or Al and of ZnO in a nitrogen-containing sputtering atmosphere. A layer is regarded as "essentially homogeneous" if the core of the layer without its boundary or surface regions is essentially homogeneous. It will be appreciated that even for such homogeneous layers their composition may vary when approaching their surfaces or boundaries depending on the deposition conditions and/or on the materials used in subsequent or preceding layers.

According to a second embodiment of the invention the compound layer has a graded composition such that the ratio of (oxy)nitride of Si and/or Al to ZnO (expressed in terms of the ratio of Si and/or Al atoms to Zn atoms) varies significantly (i.e. by more than about +/−5% around a mean composition) across its thickness even in its core part. Such graded layers may be achieved by co-sputtering target pairs of Si and/or Al (optionally doped) on the one hand and of ZnO (optionally doped) on the other hand in a nitrogen-containing sputtering atmosphere and by moving the glass pane to be coated at a given speed relative to the target pairs whereby because of the varying distance to the different targets the compound layer is deposited with a gradually modified composition across its thickness.

According to a preferred variant of the last-mentioned embodiment the ratio of (oxy)nitride of Si and/or Al to ZnO (expressed in terms of the ratio of Si and/or Al atoms to Zn atoms) repeatedly increases and decreases significantly across the thickness of the compound layer. Such a layer may be produced by co-sputtering several pairs of targets of Si and/or Al (optionally doped) on the one hand and of ZnO (optionally doped) on the other hand in a nitrogen-containing sputtering atmosphere and by moving the glass pane to be coated relative to one target pair after the other whereby the coating is deposited with a repeatedly decreasing and increasing ratio of its components. Alternatively the glass pane may repeatedly be moved back and forth relative to a single pair of targets whereby the compound layer is deposited step-by-step during several passes of the substrate relative to the target pair. It is particularly preferred if the number of repeated composition variations across a compound layer is sufficiently high so that the composition of the layers is effectively approaching an essentially homogeneous state.

Particularly good results are achieved if the mean atomic ratio of Si and/or Al to Zn in the compound layer is between about 20:1 and 1:20, preferably between about 10:1 and 1:10, even more preferred between about 5:1 and 1:5.

A Zn-rich compound layer with an atomic ratio of Si and/or Al to Zn of about 1:1 or less may be preferred when used in a lower anti-reflection layer of single or multiple silver layer coatings and/or in a spacer layer between the silver layers of multiple (e.g. double) silver layer coatings, e.g. for productivity reasons. It has been found that compound layers with an atomic ratio in the range of about 1:2 to 1:5, preferably of about 1:4, can be sputter-deposited with a particularly high productivity without impairing the heat treatability or other relevant properties of the coatings.

For the upper (outermost) anti-reflection layer of inventive coatings a more Si- and/or Al-rich compound layer should be used wherein the atomic ratio of Si and/or Al to Zn is set to a range of about 1:1.5 to 3:1, if a superior heat treatability shall be achieved.

Inventive compound layers may be applied and be useful in a large range of thicknesses. In a practically relevant range given by interference optics their preferred thickness range may be preferably about 10-60 nm, more preferred about 15-50 nm, and even more preferred about 25-40 nm when used in either a lower or upper anti-reflection layers of the coating. The range of 25-40 nm applies to the case when the compound layer makes up the major part of a lower or upper anti-reflection layer. If used in a dielectric spacer layer between two IR reflecting layers the preferred thickness ranges for the inventive compound layers are 10-120 nm, more preferred 15-100 nm, and even more preferred 25-90 nm. The lower thickness values of the thickness ranges given above apply to coating stack designs where an anti-reflection comprises at least one further dielectric layer in addition to an inventive compound layer so that the total thicknesses needed to effectively anti-reflect the IR reflection layers can be achieved.

As doped targets are often easier sputterable than pure metal oxide or semiconductor targets the compound layer may additionally comprise further metals or semiconductors or their oxides or (oxy)nitrides. A preferred ZnO sputter target dopant is Al ($Al_2O_3$) which is contained in an amount of up to about 2 wt. % (content of $Al_2O_3$ in doped oxide target) in certain commercially available Al-doped ZnO sputter targets, higher amounts of dopant not being excluded. A preferred Si target dopant is also Al which is usually added in an amount of up to about 10 wt. % or even more to commercially available Si sputter targets. While pure Al targets may be used for sputtering the Al (oxy)nitride component of the inventive compound layers it is within the scope of the invention to use doped Al targets such as sputter targets produced from technical Al alloys comprising dopants such as Ti, Zn, Mg, Si, Cu, etc., in amounts of the order of up to several wt. %. As target dopants will be embedded in the compound layer produced from such doped targets their amount and material should be chosen such that they do not impair significantly the properties of the coated glass panes aimed at by the invention.

To achieve coated glass panes with a particularly high optical and thermal performance, i.e. a high light transmittance combined with a high IR reflectance, a growth promoting layer is preferably provided as an upper part of the lower anti-reflection layer below the IR-reflecting layer. By the provision of a growth promoting layer, the material of which differs from the material of a base layer of the lower anti-reflection layer, which may be a compound layer according to the invention, before depositing a silver-based IR-reflecting layer it is generally aimed at improving the growth base for the IR-reflecting layer to increase its specific conductivity (in other words: reduce its sheet resistance at a given layer thickness). The growth promoting layer is usually deposited immediately before the deposition of the IR-reflecting layer and in direct contact with it.

It is however within the scope of the invention to arrange very thin auxiliary layers (e.g. primer layers, adhesion promoting layers, oxygen scavenger layers) immediately below a silver-based IR-reflecting layer and particularly between a growth promoting layer and a subsequent silver-based IR-reflecting layer such as known in the art if the coating properties can be further improved hereby. For such auxiliary layers having a thickness in the low nm range metals, metal alloys or their suboxides such as Ti or $TiO_x$, NiCr or $NiCrO_x$, have already been proposed, other materials not being excluded.

The growth promoting layer preferably comprises one or more of ZnO, metal-doped ZnO such as, e.g., Al-doped ZnO or Sn-doped ZnO, metal-doped In oxide such as, e.g., Sn-doped In oxide (ITO), a mixture of an (oxy)nitride of Al and of ZnO, Zn—Si oxide. ZnO and metal-doped ZnO, such as Al-doped ZnO or Sn-doped ZnO or their mixtures, are actually the most preferred materials. The growth promoting layer preferably has a thickness of about 2-20 nm, more preferably about 4-18 nm.

To protect the IR-reflecting layer during the deposition process and during a subsequent heat treatment it is preferred to provide an additional barrier layer above the IR-reflecting layer which may particularly comprise one or more of Ti, $TiO_x$, metal-doped ZnO such as, e.g., Al-doped ZnO, Sn-doped In oxide (ITO), Zn—Si oxide, other materials well known in this context, such as certain metals or metal alloys, metal (sub)oxides or metal (oxy)nitrides, not being excluded. $TiO_x$ barrier layers are preferably deposited as an at least slightly substoichiometric oxide (x<2). An essentially stoichiometric (x=2) or even slightly superstoichiometric composition (x>2) may in certain cases also provide sufficient barrier properties. The barrier layers may contain low amounts of metal dopants, e.g., if deposited from metal-doped $TiO_x$ targets (EP 1 284 302 A1) or from Al-doped ZnO targets.

The barrier layer should have a thickness of about 0.5-15 nm, preferably about 1-10 nm. Its thickness will usually be nearer to the lower limit if it is of a more absorbing (metallic) nature, and it may be made thicker the more transparent (oxidic) it is. Oxidic barrier layers which are at least slightly sub-stoichiometric at least immediately after their deposition may provide a better protection for the IR-reflecting layer during a heat treatment and during the deposition of a subsequent layer than fully oxidised barrier layers. The thickness of barrier layers and their potential to absorb (scavenge) oxygen during a heat treatment are usually chosen in combination such that—at least if a high light transmittance is aimed at—after a heat treatment they are essentially fully oxidised and show a low light absorbance. A barrier layer particularly preferred for inventive coatings comprises both $TiO_x$ and Al-doped ZnO, either as two separate or overlapping (graded) partial layers or as a mixed layer. Such layer may preferably be produced by co-sputtering a $TiO_x$ target and an Al-doped ZnO target.

A simple coating design can be achieved if each of the anti-reflection layers comprises a compound layer containing a mixture of an (oxy)nitride of Si and/or Al and of ZnO. A basic layer sequence of such inventive coatings would therefore be:
glass pane/optionally dielectric layer, e.g. high refractive index layer/compound layer/optionally growth promoting layer/optionally thin primer layer/Ag/optionally barrier layer/compound layer/optionally protective layer Measurable improvements of the mechanical and/or chemical durability and/or heat treatability over known low-e and/or solar control coatings can however already be achieved if at least one of their dielectric layers, specifically one of their Si and/or Al (oxy)nitride layers or of their Zn—Sn oxide layers, is replaced by a compound layer according to the invention. Some non-limiting examples of more general inventive layer sequences comprising both an inventive compound layer and a conventional layer of the Si/Al (oxy)nitride or Zn—Sn oxide type are:
glass pane/opt. dielectric layer, e.g. high refractive index layer/compound layer/opt. growth promoting layer/opt. thin primer layer/Ag/opt. barrier layer/dielectric layer, e.g. comprising a Si and/or Al (oxy)nitride and/or a Zn—Sn oxide layer/opt. protective layer; or
glass pane/opt. dielectric layer, e.g. high refractive index layer/dielectric layer, e.g. comprising a Si and/or Al (oxy)nitride and/or a Zn—Sn oxide layer/growth promoting layer/opt. thin primer layer/Ag/barrier layer/compound layer/opt. protective layer In addition or alternatively to an inventive compound layer therefore at least one of the anti-reflection layers may comprise at least one dielectric layer which—specifically if the coated glass pane shall be heat treatable—may comprise one or more of Zn—Si oxide, Zn—Sn oxide (e.g. zinc stannate), Si (oxy)nitride, Al (oxy)nitride, In—Sn oxide (ITO), Bi oxide, Sn—Si oxide, Bi—Sn oxide or the like. High refractive index materials having an index of refraction (at 550 nm) of more than about 2.3 such as, e.g., Ti oxide ($TiO_2$) or Bi oxide may—as well known in the art—be chosen specifically as a partial layer of the lower anti-reflection layer to achieve a more neutral appearance of the coated glass panes. Other dielectric materials known for anti-reflection purposes may optionally be chosen for partial layers of inventive coatings, the choice of materials being significantly higher if the coated glass pane does not need to be heat treatable.

As an alternative to a high refractive index layer the optional lowermost dielectric layer of the lower anti-reflection layer contacting the glass substrate may preferably be provided as Al (oxy)nitride layer, either alone or in combination with at least one subsequent dielectric layer, particularly a compound layer, and/or a growth promoting layer.

While the inventive compound layer may advantageously be used together with a variety of IR-reflecting layers, the invention specifically concerns coated glass panes wherein the IR-reflecting layer comprises silver or a silver-based alloy.

While the invention is not limited with regard to the thickness of the IR-reflecting layer(s) of the coating—as long as it is (they are) light transmitting—it is in most cases preferred if an IR-reflecting layer of silver or of a silver-based alloy has a thickness of about 6-20 nm, preferably of about 6-15 nm.

The invention has proven particularly useful for low-e and/or solar control coatings which comprise two or more IR-reflecting layers functioning as interference filter of the Fabry-Perot type together with lower and upper anti-reflection layers as well as spacer layers separating two subsequent IR-reflecting layers. Such coatings are well known both for architectural and automotive applications where a particularly high ratio between light transmittance and solar energy transmittance ("selectivity") is aimed at and/or where narrow reflection or trans-mission colour specifications need to be met.

The invention is therefore in one embodiment directed to coatings comprising at least two sequences of layers "lower anti-reflection layer, opt. including an upper growth promoting layer/IR-reflecting layer/opt. barrier layer/upper anti-reflection layer" wherein the upper anti-reflection layer of one sequence of layers is combined with the lower anti-reflection layer of a subsequent sequence of layers so as to provide a spacer layer between the two IR-reflecting layers of said sequences of layers and wherein at least one of the anti-reflection layers comprises an inventive compound layer.

Again an embodiment simplifying the coating design is characterised in that each of the anti-reflection layers and spacer layer(s) comprises a compound layer containing a mixture of an (oxy)nitride of Si and/or Al and of ZnO. A basic non-limiting layer sequence of such coating would be:
glass pane/opt. dielectric layer, e.g. high refractive index layer/compound layer/opt. growth promoting layer/opt. thin primer layer/Ag/opt. barrier layer/compound layer/opt. growth promoting layer/opt. thin primer layer/Ag/opt. barrier layer/compound layer/opt. protective layer.

More generally at least one (but not all) of the compound layers in the preceding layer sequence may be replaced or at least one compound layer may be complemented with other dielectric layers such as specifically Si and/or Al (oxy)nitride or Zn—Sn oxide layers to achieve useful low-e and/or solar control coatings.

Again the optional lowermost dielectric layer of the lower anti-reflection layer contacting the glass substrate may preferably be provided as Al (oxy)nitride layer.

Further auxiliary layers may be added to the coating to optimize its behaviour. For instance the mechanical and chemical resistance of the coated glass pane may be further improved if a protective layer of a metal (alloy) oxide or (oxy)nitride is additionally provided above the outermost anti-reflection layer or embedded in such layer as a splitting layer. Protective layers comprising an oxide or (oxy)nitride of Ti, Si, Al and/or Zn—Si are particularly preferred. Protective layers of that kind may be applied in a thickness of about 0.5-10 nm, preferably of about 1-6 nm, thicker layers not being excluded. Such protective layers may alternatively or additionally serve the purpose of adapting (improving) the adhesion of the coating to the interlayer of a laminated glass pane comprising an inventive coated glass pane or to provide a better refractive index match to the interlayer.

The invention is primarily directed to high light transmittance and high IR reflectance coatings. For such coatings all partial layers shall preferably be chosen and deposited such that they have a low level of light and IR absorptance at least after a heat treatment. If, however, the solar control properties of the coating shall be enhanced and the level of solar energy and light transmittance shall be reduced, the inventive coatings may comprise partial layers which are light and/or solar energy absorbing, either by adding at least one absorbing layer or by designing any of the partial layers as absorbing layer, such as well known in the art.

The invention is also directed to a process for the production of a heat treated coated glass pane wherein a coated glass pane according to the invention is heat treated for about 1-10 min. at temperatures between 580-690° C. and thereafter bent and/or toughened.

The invention also comprises a heat treated coated glass pane with a low-e and/or solar control coating according to the invention which has a haze value of less than about 0.5%, preferably of at most about 0.3%. A particular advantage of the use of the inventive compound layer as compared to certain heat treatable coatings of the prior art is that at least in certain embodiments of the invention haze values significantly below 0.5% are achieved even after heat treatments in the more severe upper part of the temperature range 580-690° C.

Heat treated coated glass panes according to the invention are preferably used either for automotive glazings (e.g. windscreens, side lights, rear lights, roof lights) or glazings in buildings (e.g. window glazings, façade glazings, interior glazings). As the coatings are usually not sufficiently stable to be used on monolithic glazings the inventive coated glass panes will usually be assembled to glazings such as laminated glass panes or multiple glazings wherein the coating is facing either an adhesive plastic interlayer or a gas-filled sealed interspace.

A laminated glass pane comprising at least one heat treated (e.g. bent) inventive coated glass pane, at least one adhesive plastic interlayer, optionally at least one further glass or plastic pane, wherein the coating of the glass pane faces the interlayer, is particularly useful for vehicle windscreens or other automotive glazings. It is preferred to design the inventive coating by choosing an appropriate layer sequence and by adapting the thicknesses of the individual layers so that such laminated glass pane achieves a light transmittance value $T_L$ of at least 70%, preferably of at least 75%, to enable its use as a solar control automotive windscreen. It goes without saying that the invention is also applicable to coated glass panes and products made therefrom with lower light transmittances.

The invention is hereinafter explained in more detail with the aid of non-limiting drawings and examples. The figures show.

Figure 1:
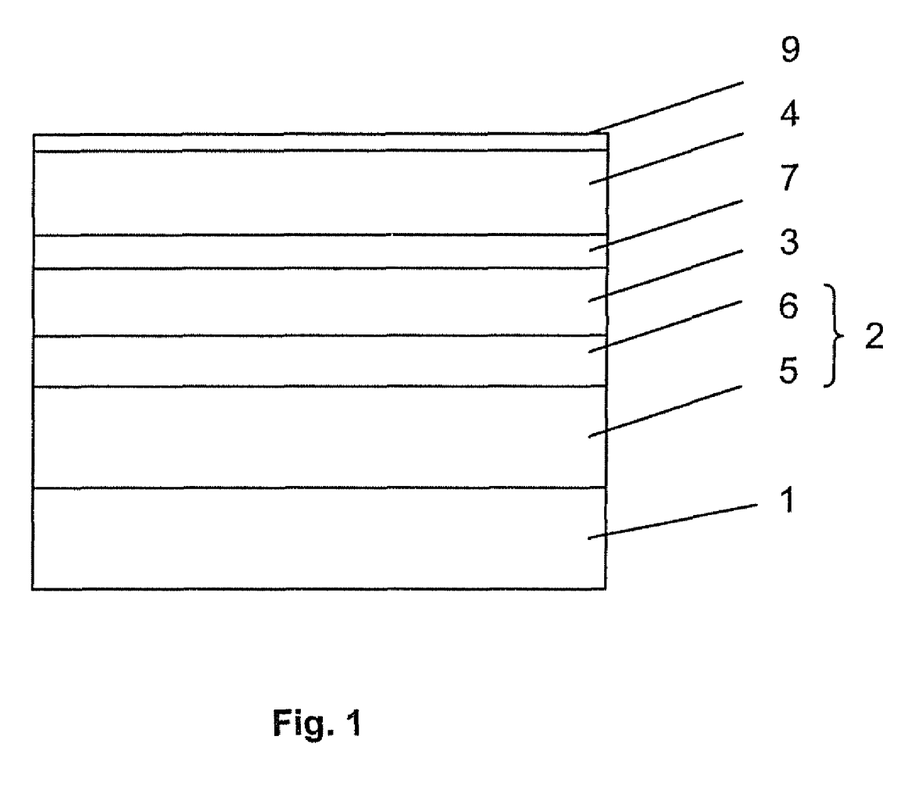
FIG. 1 a schematic cross section of a first embodiment of the invention with one IR-reflecting layer, FIG. 2 a schematic cross section of a second embodiment of the invention with two IR-reflecting layers, FIG. 3 a graph reflecting the layer sequence of an exemplary inventive coating according to an XPS analysis, FIG. 4 a graph reflecting the layer sequence of another exemplary inventive coating according to an XPS analysis, FIGS. 5-7 graphs displaying a comparison of certain properties between coatings according to the invention comprising Si (oxy)nitride-ZnO compound layers and similar Si nitride-based coatings.

FIG. 1 shows a basic layer sequence of an inventive low-e and/or solar control coating with only one IR-reflecting layer, which has been deposited on a glass pane 1. The glass pane 1 usually consists of soda lime silica glass without the invention being restricted thereto. It may be clear or body-tinted. In certain embodiments the glass pane 1 may be used as monolithic glass pane. The glass pane 1 may however preferably be laminated to other constituents of a laminated glass pane either before the deposition of the coatings or thereafter. It may also be assembled with further panes or the like to a multiple glazing unit. Its thickness is not particularly limited; it will typically be between 1 and 20 mm.

The coating of FIG. 1 comprises in sequence from the surface of the glass pane 1:

a lower anti-reflection layer 2 which consists of a base layer 5 and of an optional growth promoting layer 6, an IR-reflecting layer 3, an optional barrier layer 7, an upper anti-reflection layer 4, and an optional outermost protective layer 9.

At least one of the anti-reflection layers 2, 4 comprises a compound layer according to the invention.

In a simple embodiment of the invention one or both of the anti-reflection layers 2, 4 may only consist of an inventive compound layer without any further partial layer. It is however an option to use the inventive compound layer only as a partial layer of an anti-reflection layer 2, 4 and to complement it with further partial layers. As shown in FIG. 1 it is a preferred embodiment of the invention if the lower anti-reflection layer 2 comprises at least a base layer 5 and a growth-promoting layer 6 consisting of a different material than the base layer 5. In this case the relatively thick base layer 5 takes among other functions the role of the main part of the lower anti-reflection layer 2, possibly combined with a barrier function against the diffusion of atoms of the glass pane 1 through the coating during a heat treatment. The usually thinner growth promoting layer 6 primarily serves as a growth promoting base for the subsequently deposited IR-reflecting layer 3. A further very thin auxiliary layer (not shown) may in certain cases be provided between the growth promoting layer 6 and the IR-reflecting layer 3, for example to improve the adhesion between both layers, serve as oxygen scavenger or absorber or further improve the heat treatability.

A compound layer according to the invention may preferably be used for the base layer 5 of a lower anti-reflection layer 2. At least in its Si (oxy)nitride-ZnO version it was found that it is not particularly suitable to be used as a growth promoting layer 6. If a compound layer of a mixture of Si (oxy)nitride and ZnO is used in the lower anti-reflection layer 2 it should preferably be used as base layer 5 and be complemented by a growth promoting layer 6 of ZnO or the like to reduce the sheet resistance of a subsequent silver-based IR-reflecting layer 3. As already stated earlier the inventive compound layers are able to replace layers of the Al and/or Si (oxy)nitride, Zn oxide or Zn—Sn oxide type in known low-e and/or solar control coatings, only slight thickness adaptations being necessary because of the very similar refractive indices of these layers. A growth promoting layer 6 consisting of ZnO or metal-doped ZnO, e.g. Al-doped or Sn-doped ZnO, is preferably used in combination with an inventive compound layer if provided as base layer 5.

As explained above the compound layer may contain its components (oxy)nitride of Si and/or Al on the one hand and ZnO on the other hand in varying ratios (expressed in terms of the ratio of Si and/or Al atoms to Zn atoms), atomic ratios between about 20:1 and 1:20 being preferred, ratios between about 10:1 and 1:10 being more preferred and ratios between 5:1 and 1:5 being most preferred.

Mixtures of (Al-doped) Si (oxy)nitride with (Al-doped) ZnO have proven most suitable materials for the compound layer to provide high quality heat treatable coatings having high light transmittance and low solar energy transmittance. It has been found that for atomic ratios of Si and/or Al to Zn of about 20:1 to 1:20 the refractive index (at 550 nm) of such compound layers is in the range of about 2-2.2 which makes these compound layers particularly suitable to replace medium refractive index materials like, e.g., ZnO, $SnO_2$, Zn—Sn oxide (zinc stannate) or Si (oxy)nitride as dielectric layers in low-e and/or solar control coatings.

The compound layer may be deposited using different processes and devices, sputtering with conventional large-area sputtering devices and processes being most preferred. The components of the compound layers (or their basic constituents in the case of reactive sputtering) may preferably be provided as planar or cylindrical (rotating) targets. The targets may—depending on their nature—be sputtered under DC, pulsed DC, HF (RF) or medium frequency (MF) or any other suitable conditions. Glass panes to be coated may be moved below or above essentially horizontally arranged targets or along essentially vertically arranged targets.

It is particularly preferred to use target pairs (or even groups of more than two targets) of Si and/or Al (optionally doped) on the one hand and of metal-doped ZnO (e.g. Al-doped ZnO=ZnO:Al) on the other hand and to sputter these target pairs or groups in a sputter atmosphere containing in addition to the necessary inert component (Ar) only or mainly nitrogen as reactive sputter gas. Medium frequency, DC, pulsed DC or any other appropriate sputter technology may by applied. Oxygen is preferably only present as part of unavoidable residual or adsorbed gases. It is hereby possible to deposit the (oxy)nitride component of the compound layer without an undue oxidation of the easily oxidizable elements Al and/or Si taking place. At the same time it is taken advantage of the fact that metal-doped ZnO can be sputtered from a ceramic metal-doped ZnO target in a sputter atmosphere to which no oxygen or only a very minor proportion of oxygen is added. Alternatively mixed targets containing Si and/or Al and ZnO may be sputtered in a sputter atmosphere containing nitrogen as reactive sputter gas.

Generally it is most preferred to control the deposition process such that a compound layer with a low value of the imaginary part of its refractive index is deposited such that it is essentially non-absorbing in the visual part of the spectrum.

In addition to the inventive compound layer or alternatively thereto the anti-reflection layer 2 may comprise at least one (further partial) dielectric layer such as explained herein before (not shown).

In most cases it will be preferable or necessary to provide an auxiliary barrier layer 7 above the IR-reflecting layer 3, specifically if the coated glass pane needs to be heat treatable. Such a barrier layer 7 serves to protect the IR-reflecting layer 3 during the manufacture of the coating and during a subsequent heat treatment by providing a diffusion barrier function and/or an oxygen-scavenger function such as well known in the art. The barrier layer 7 may comprise a single layer or several partial layers. The total barrier layer thickness is usually in the range of about 0.5-15 nm as explained above. In those cases where a high light transmittance is aimed at it is preferred to use either materials which are at most slightly absorbing in the visible spectral range at least after a heat treatment or to use only very thin light absorbing barrier layers 7.

Suitable materials for the barrier layer 7 are (as well known to the person skilled in the art): metals and metal alloys, their substoichiometric oxides or in some cases even their (at most slightly substoichiometric) oxides, their oxynitrides and their nitrides. In the context of the invention materials for the barrier layer 7 are preferably chosen from one or more of: Ti, $TiO_x$, metal-doped ZnO such as, e.g., Al-doped ZnO, as most preferred materials, and Sn-doped In oxide (ITO), Zn—Si oxide. A barrier layer 7 particularly preferred for inventive coatings comprises both $TiO_x$ and Al-doped ZnO, either as two separate partial or overlapping (graded) layers or as a mixed layer. Such mixed or graded barrier layer 7 may preferably be produced by co-sputtering a $TiO_x$ target (optionally substoichiometric and/or doped) and an Al-doped ZnO target.

The upper anti-reflection layer 4 may—such as the lower anti-reflection layer 2—be a single layer or comprise several partial layers. In its simplest design it may consist only of a compound layer according to the invention and everything said above about the compound layer and its manufacture also applies to the upper anti-reflection layer 4. The upper anti-reflection layer 4 may—like the lower anti-reflection layer 2—comprise either in addition or alternatively at least one (further partial) dielectric layer, e.g. those mentioned above as preferred for the lower anti-reflection layer 2.

The optional outermost protective layer 9 serves to increase the robustness of the coating against mechanical or chemical influences and if its thickness is in the range of about 1-10 nm and preferably about 2-6 nm it generally has only a negligible effect on the optical properties of the coating. The protective layer 9 may be composed of materials which are well known for their hardness or chemical resistance. While several metal (alloy) oxides or (oxy)nitrides are applicable for such a protective layer 9, an oxide or (oxy)nitride of Ti, Si, Al and/or Zn—Si is preferred. As already stated above such protective layers 9 may alternatively or additionally serve the purpose of adapting (improving) the adhesion of the coating to the interlayer of a laminated glass pane comprising an inventive coated glass pane or to provide a better refractive index match to the interlayer. Here as for other purposes it may be appropriate to use even thicker outermost protective layers 9. As an alternative a protective layer may be arranged as splitting layer embedded in the outer anti-reflection layer (not shown).

Without wishing to restrict the invention hereto certain advantageous layer sequences are presented hereinafter for a coating with a single IR-reflecting layer 3:

glass pane/compound layer of $SiN_x$—ZnO (Al-doped) as base layer 5/(metal-doped) ZnO as growth promoting layer 6/Ag as IR-reflecting layer 3/barrier layer 7 comprising, e.g., TiO$_x$ and/or ZnO:Al/compound layer of SiN$_x$—ZnO (Al-doped) as upper anti-reflection layer 4/optionally protective layer 9 of, e.g., oxides or (oxy) nitrides of Si and/or Al, TiO$_2$.

Figure 2:
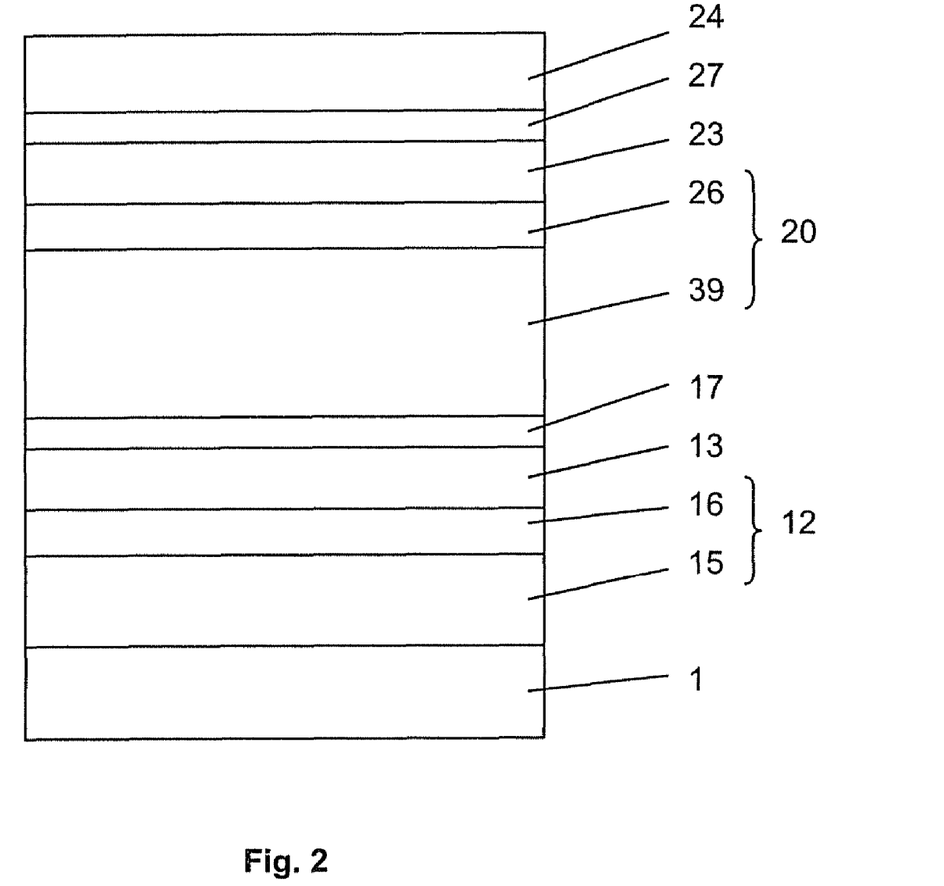

The low-e and/or solar control coating of FIG. 2 comprises in sequence from the surface of the glass pane 1:

a first lower anti-reflection layer 12 which consists of a first base layer 15 and of a first (optional) growth promoting layer 16,
a first IR-reflecting layer 13,
a first (optional) barrier layer 17,
a spacer layer 20 which consists of a central layer 39 and of a second (optional) growth promoting layer 26,
a second IR-reflecting layer 23,
a second (optional) barrier layer 27, and
a second upper anti-reflection layer 24.

The coating of FIG. 2 comprises two layer sequences of the same general structure, each comprising a lower anti-reflection layer, an IR-reflecting layer 13, 23 and an upper anti-reflection layer. The first upper anti-reflection layer of the first, lower layer sequence is combined with the second lower anti-reflection layer of the second sequence of layers to form a spacer layer 20 spacing the two IR-reflecting layers 13, 23 such that they function as a Fabry-Perot type interference filter. In the exemplary embodiment shown in FIG. 2 the first lower anti-reflection layer 12 comprising a base layer 15 and a growth promoting layer 16 and the second upper anti-reflection layer 24 serve similar functions as the layers 2, 5, 6 and 4 of FIG. 1. A second growth promoting layer 26 is provided below the second IR-reflecting layer 23 and above the central layer 39 which is effectively a combination of the first upper anti-reflection layer of the first layer sequence and the second base layer of the second lower anti-reflection layer of the second sequence of layers.

An outermost protective layer is not shown in FIG. 2 but may be provided to increase the robustness or other properties of the coating if needed such as explained for the single IR-reflecting layer coating above.

What has been explained for the coating of FIG. 1 and specifically for the use of the inventive compound layer also applies generally to the coating of FIG. 2.

A preferred layer sequence is as follows:

glass pane/compound layer of SiN$_x$—ZnO (Al-doped) as first base layer 15/(metal-doped) ZnO as first growth promoting layer 16/Ag as first IR-reflecting layer 13/first barrier layer 17 comprising, e.g., TiO$_x$ and/or ZnO:Al/compound layer of SiN$_x$—ZnO (Al-doped) as central layer 39/(metal-doped) ZnO as second growth promoting layer 26/Ag as second IR-reflecting layer 23/second barrier layer 27 comprising, e.g., TiO$_x$ and/or ZnO:Al/compound layer of SiN$_x$—ZnO (Al-doped) as upper anti-reflection layer 24/optionally protective layer of, e.g., oxides or (oxy)nitrides of Si and/or Al, TiO$_2$ It will be appreciated and does not need to be explained in detail in the context of this invention that the thicknesses of the individual layers will need to be set according to the optical and other properties of the coated glass panes aimed at in a specific application. Formulas and software to calculate and simulate low-e and/or solar control coatings are available to those skilled in the art to calculate appropriate layer thicknesses.

The invention is now explained by way of several examples. In all examples 2.1 mm thick clear float glass panes (T$_L$≈90%) were used as substrates to be coated.

EXAMPLE 1

A coating comprising several layers as shown in Table 1 below was deposited onto a glass pane in a sputtering plant having several separate sputtering chambers in which the following targets or target pairs were arranged:

(1) A first target pair comprising
  (a) a metal-doped Si target comprising as main dopant about 10 wt. % Al (commercially available as SISPA™ 10 from W.C. Heraeus), and
  (b) a ceramic Al-doped Zn oxide target comprising about 2 wt. % Al$_2$O$_3$ (commercially available as ZAO™ from W.C. Heraeus);

(2) a zinc target;

(3) a silver target;

(4) a second target pair comprising
  (a) a ceramic TiO$_x$ target (x<2) (TiO$_x$ targets are commercially available as CLATO™ from W.C. Heraeus, and
  (b) a ceramic ZnO:Al target comprising about 2 wt. % Al$_2$O$_3$ (commercially available as ZAO™ from W.C. Heraeus).

The sputtering plant allowed moving the glass pane during one or several passes at a controlled velocity relative to the targets or target pairs of one of its chambers until a layer of the intended thickness had been deposited. When more than one pass was necessary the substrate transport direction was reversed after one pass and the substrate was moved in the opposite direction during a subsequent pass. After the completion of the deposition of one layer the glass pane was transferred to another sputtering chamber to enable the deposition of the sub-sequent layer. The target pairs were part of dual cathode pulsed DC sputtering devices which were operated at about 150 kHz using commercially available power supplies.

The chambers were evacuated before initiating the deposition process and appropriate sputtering gases were then introduced as needed and as shown in Table 2.

The coating of Example 1 had the layer sequence (beginning on the glass surface) as shown in Table 1:

TABLE 1

| layer composition | thickness [nm] | drawing ref. no. |
| --- | --- | --- |
| compound layer of Al-doped SiN$_x$—ZnO, Si:Zn ratio ≈ 2:1 | 35 | 15 |
| ZnO | 6.5 | 16 |
| Ag | 8 | 13 |
| mixed ZnO:Al/TiO$_x$ | 7.5 | 17 |
| compound layer of Al-doped SiN$_x$—ZnO, Si:Zn ratio ≈ 2:1 | 70 | 39 |
| ZnO | 6.5 | 26 |
| Ag | 8 | 23 |
| mixed ZnO:Al/TiO$_x$ | 7.5 | 27 |
| compound layer of Al-doped SiN$_x$—ZnO, Si:Zn ratio ≈ 2:1 | 35 | 24 |

The atomic ratios given for the compound layers refer to average compositions of the graded layers as determined by XPS using an Amicus XPS device manufactured by Kratos. The analysis method is semi-quantitative and the results obtained were processed using Wagner relative sensitivity factors to provide the atomic ratios given in Table 1 above and Table 5 below.

The deposition of the individual layers was performed under conditions as summarized in Table 2:

TABLE 2

| drawing ref. no. | target comp. | Power [kW] | Power type | Ar [sccm] | $N_2$ [sccm] | $O_2$ [sccm] | velocity [mm/min] | no. passes |
|---|---|---|---|---|---|---|---|---|
| 15 | Si:Al/ZnO:Al | 10/2 | Pulsed DC | 200 | 150 | — | 821 | 2 |
| 16 | Zn | 14 | DC | 140 | — | 450 | 5900 | 1 |
| 13 | Ag | 1.5 | DC | 250 | — | — | 1875 | 1 |
| 17 | $TiO_x$/ZnO:Al | 3/3 | Pulsed DC | 175 | — | — | 967 | 1 |
| 39 | Si:Al/ZnO:Al | 10/2 | Pulsed DC | 200 | 150 | — | 821 | 4 |
| 26 | Zn | 14 | DC | 140 | — | 450 | 5900 | 1 |
| 23 | Ag | 1.5 | DC | 250 | — | — | 1875 | 1 |
| 27 | $TiO_x$/ZnO:Al | 3/3 | Pulsed DC | 175 | — | — | 967 | 1 |
| 24 | Si:Al/ZnO:Al | 10/2 | Pulsed DC | 200 | 150 | — | 821 | 2 |

EXAMPLE 2

A coating with essentially the same layer sequence and thicknesses as in Example 1 was deposited. Other than in Example 1 however the compound layers were deposited by passing the substrate about 4 times faster below the Al-doped Si (Si:Al)/Al-doped ZnO (ZnO:Al) target pairs and by using accordingly 8-16-8 passes to deposit the three compound layers with essentially the same total thicknesses as in Example 1. The deposition conditions are summarized in Table 3:

TABLE 3

| Drawing ref. no. | Target comp. | Power [kW] | Power type | Ar [sccm] | $N_2$ [sccm] | $O_2$ [sccm] | Velocity [mm/min] | No. of passes |
|---|---|---|---|---|---|---|---|---|
| 15 | Si:Al/ZnO:Al | 10/2 | Pulsed DC | 200 | 150 | — | 3284 | 8 |
| 16 | Zn | 14 | DC | 140 | — | 450 | 5900 | 1 |
| 13 | Ag | 1.5 | DC | 250 | — | — | 1875 | 1 |
| 17 | $TiO_x$/ZnO:Al | 3/3 | Pulsed DC | 175 | — | — | 967 | 1 |
| 39 | Si:Al/ZnO:Al | 10/2 | Pulsed DC | 200 | 150 | — | 3284 | 16 |
| 26 | Zn | 14 | DC | 140 | — | 450 | 5900 | 1 |
| 23 | Ag | 1.5 | DC | 250 | — | — | 1875 | 1 |
| 27 | $TiO_x$/ZnO:Al | 3/3 | Pulsed DC | 175 | — | — | 967 | 1 |
| 24 | Si:Al/ZnO:Al | 10/2 | Pulsed DC | 200 | 150 | — | 3284 | 8 |

Figure 3:
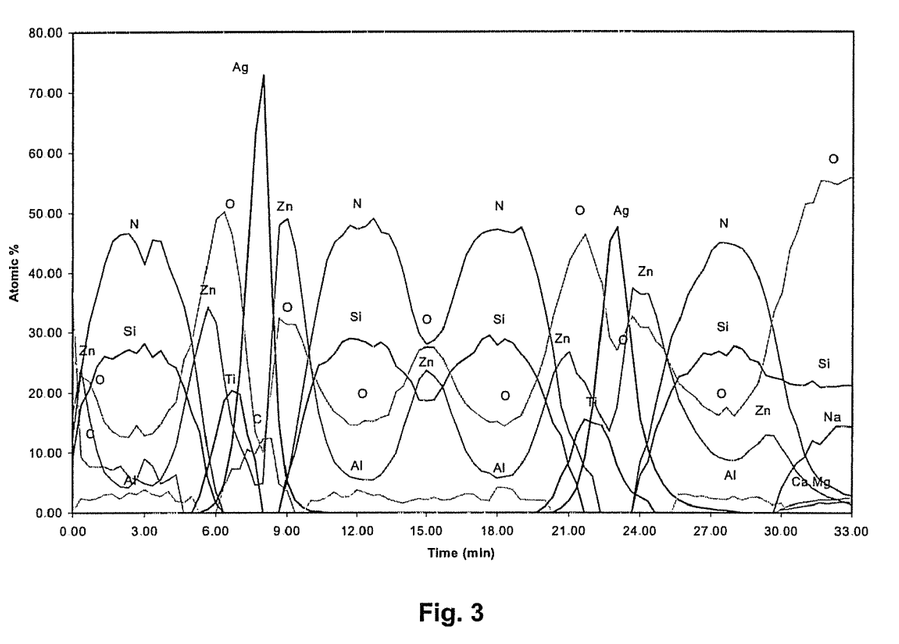
Figure 4:
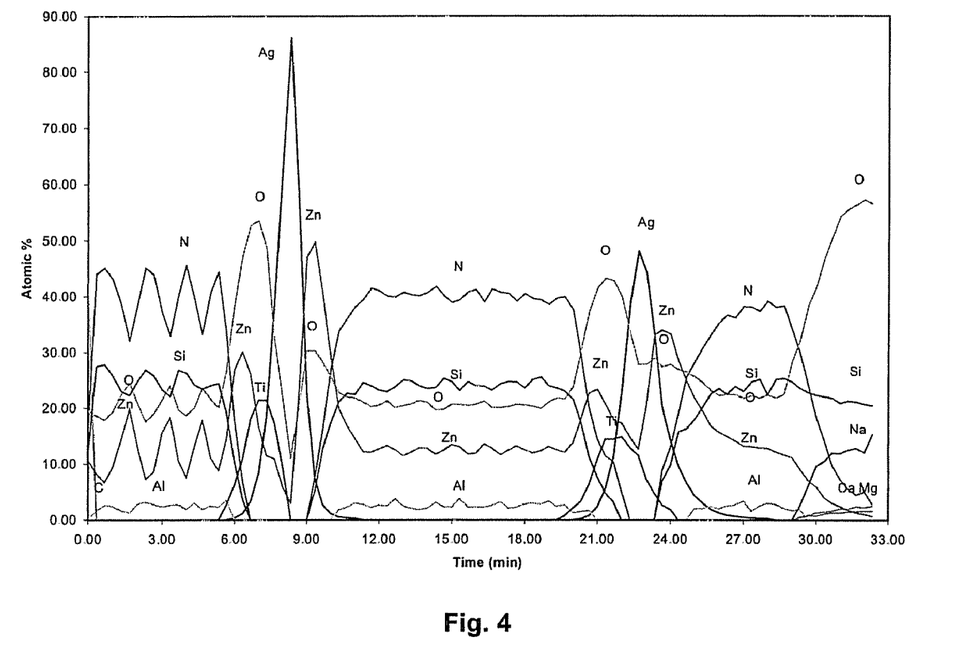

Coated glass panes with layer stacks according to Examples 1 and 2 were analyzed by XPS analysis and the results are shown in FIG. 3 (layer stack corresponding to Example 1) and FIG. 4 (layer stack corresponding to Example 2). The XPS analysis provides a semi-quantitative analysis of the layer sequence of a coating.

A comparison of FIG. 3 and FIG. 4 shows that in both cases the compound layers arranged below, above and between the two silver IR-reflecting layers are non-homogeneous graded layers, the relative proportions of Al-doped Si nitride and of Al-doped ZnO varying significantly across the thickness of each of the compound layers. In Example 1 the amplitude of the variation is significantly higher than in Example 2 and the number of peaks and valleys is only one quarter of the number in Example 2 which is caused by the higher number of passes (8-16-8) at higher velocities below the target pairs in Example 2 as compared to 2-4-2 passes in Example 1. A higher number of passes obviously leads to a composition of the compound layer which is approaching an essentially homogeneous state.

COMPARATIVE EXAMPLE 3

A comparative coating was produced which had a layer sequence similar to that of Examples 1 and 2 with the only difference that all compound layers 15, 39 and 24 were replaced by pure (Al-doped) Si nitride layers of appropriate thicknesses produced by reactive sputtering of Al-doped Si targets in a sputtering atmosphere containing Ar and $N_2$ as sputter gases.

Coated glass panes according to Examples 1 and 2 and Comparative Example 3 were heat treated at 650° C. and at 680° C. which resulted in the values of light transmittance and sheet resistance as shown in the following Table 4:

TABLE 4

|  | Sheet res. before HT (650° C.) [Ω/□] | Sheet res. after HT (650° C.) [Ω/□] | $T_L$ [%] before HT (650° C.) | $T_L$ [%] after HT (650° C.) | Sheet res. before HT (680° C.) [Ω/□] | Sheet res. after HT (680° C.) [Ω/□] | $T_L$ [%] before HT (680° C.) | $T_L$ [%] after HT (680° C.) |
|---|---|---|---|---|---|---|---|---|
| Ex. 1 2-4-2 passes | 3.22 | 2.42 | 79.7 | 82.4 | 3.22 | 2.37 | 79.7 | 82.6 |
| Ex. 2 8-16-8 passes | 3.25 | 2.04 | 79.3 | 83.1 | 3.25 | 1.86 | 79.3 | 83.0 |
| C. Ex. 3 $SiN_x$ | 3.68 | 3.15 | 80.8 | 80.3 | 3.68 | 3.26 | 80.6 | 79.8 |

It can be seen that the coating of Example 1 behaves practically the same at both temperatures whereas the coating of Example 2 with its more homogeneous compound layers shows improved properties (slightly better light transmittance and significantly reduced sheet resistance) when heat treated at 680° C. as compared to 650° C. More homogeneous compound layers may therefore be more appropriate for heat treatable coatings which shall be heat treated in the upper part of the temperature range 580-690° C.

The $SiN_x$-based coating according to Comparative Example 3 displays a lower reduction rate of its sheet resistance during the heat treatments and its sheet resistance is significantly higher than the sheet resistance of the inventive coatings both before and after the heat treatments which correlates to a higher normal emissivity at essentially the same thicknesses of the IR-reflecting layers. A heat treatment at 680° C. leads to a reduction in the light transmittance of the coated glass pane of the Comparative Example 3. The final light transmittance of the heat treated coated glass panes of Examples 1 and 2 is significantly higher than the final light transmittance of the coated glass pane of Comparative Example 3. Heat treated coated glass panes according to the invention therefore enable to achieve a significantly lower sheet resistance (higher IR reflection) and a significantly higher final light transmittance than $SiN_x$-based coatings.

In a number of additional experiments coated glass panes having essentially the same layer sequences as in Example 1 and in Comparative Example 3 were prepared, with the following differences:

The thicknesses of the compound layers 15, 39 and 24 in inventive coatings and of the $SiN_x$ layers in the comparative coating were set to 40, 80 and 40 nm respectively (as compared to 35, 70 and 35 nm in Example 1) achieved with 2-4-2 passes below the targets at a slightly decreased velocity;

A power ratio of 10 kW:4 kW was used for the Si:Al/ZnO:Al targets to deposit the compound layers 15, 39 and 24 of the further inventive examples, whereby an atomic ratio of Si:Zn of about 1:1.2 (analysed by XPS) was achieved in these layers.

The coated glass panes were heat treated for 5 minutes at temperatures of 650° C., 660° C., 670° C. and 680° C. inside a muffle furnace. Before and after the heat treatment the sheet resistance, light transmittance and haze values of the coated glass panes were measured. The results are displayed in FIG. 5-7.

Figure 5:
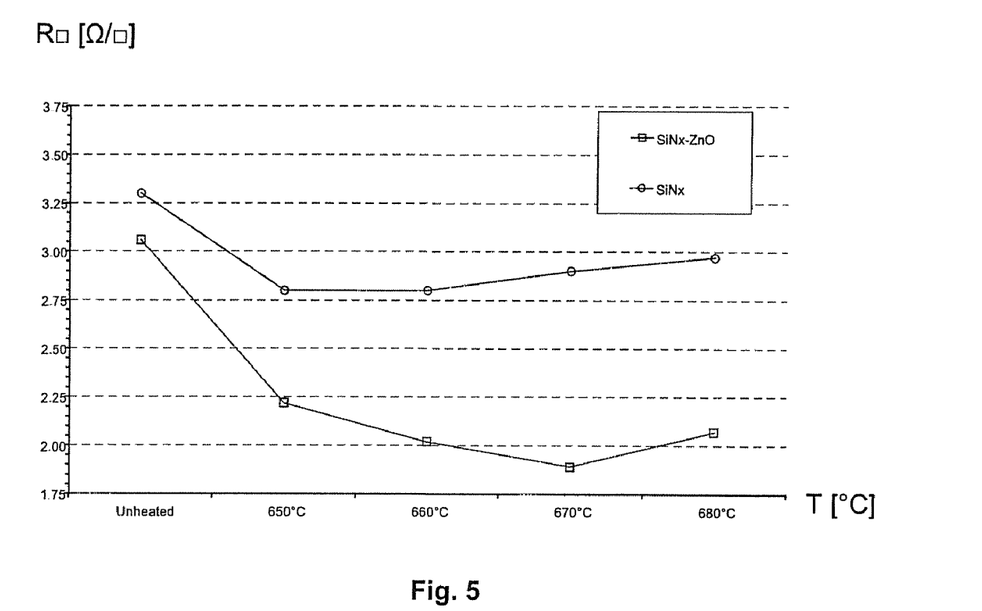
Figure 6:
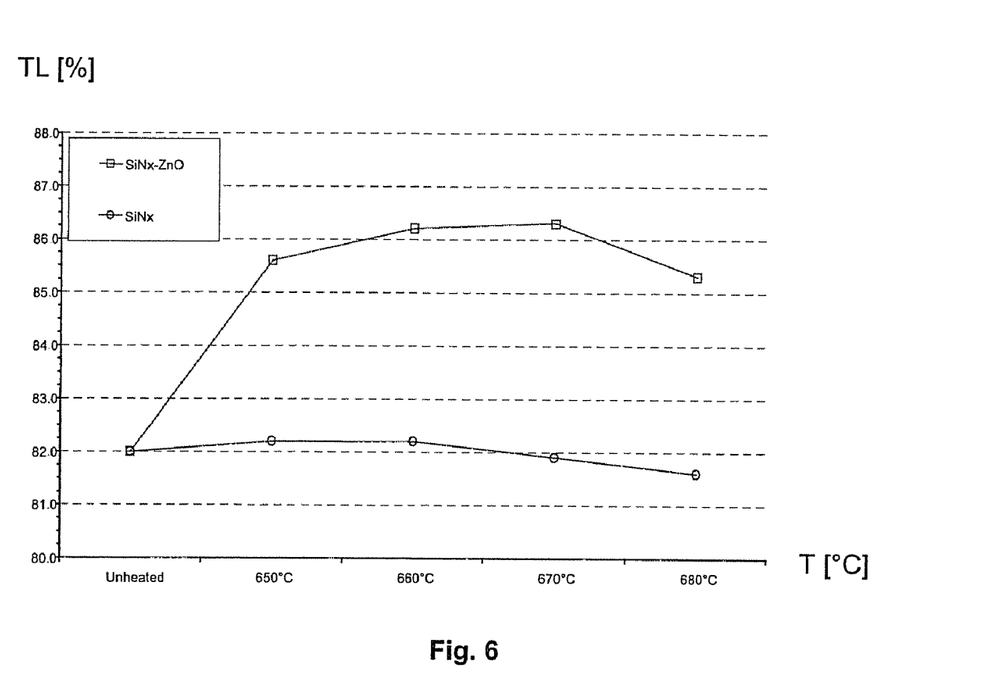
Figure 7:
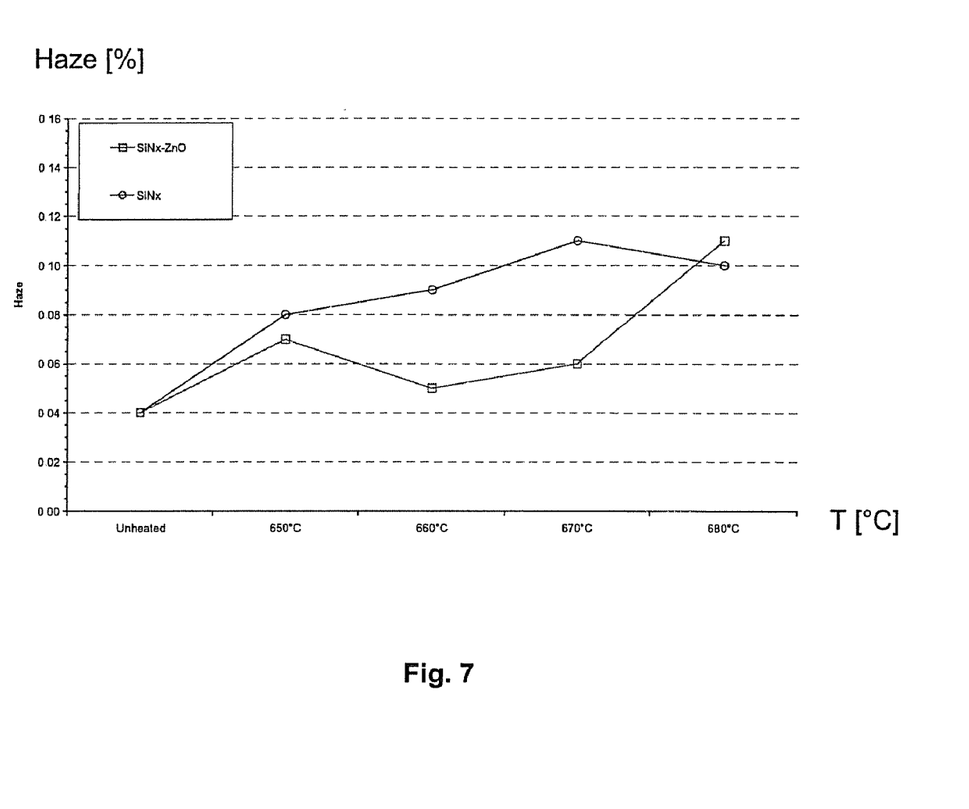

It can be seen that coated glass panes comprising compound layers according to the invention show a better performance at temperatures between 650 and 680° C. than coated glass panes using Si nitride layers in place of the compound layers, both in terms of sheet resistance and of light transmittance, each before and after heat treatment. The haze values after heat treatment remained extremely low for inventive coatings up to a heat treatment temperature of 680° C. While the properties of the $SiN_x$-based coatings at most remain essentially stable during a heat treatment the light transmittance and sheet resistance values of inventive coatings are significantly improved by such a heat treatment.

EXAMPLES 4-9 AND COMPARATIVE EXAMPLE 10

In a further series of experiments the Si:Zn atomic ratio in the compound layers of coatings having a layer sequence similar to that in Example 1 was varied, again with the following differences:

The thicknesses of compound layers 15, 39 and 24 in inventive coatings and of the (Al-doped) Si nitride layers of the comparative coating of Comp. Ex. 10 were set to 40, 80 and 40 nm respectively (as compared to 35, 70 and 35 nm in Example 1 and Comp. Ex. 3) achieved with 2-4-2 passes below the targets at a slightly decreased velocity;

The power ratio used for the Si:Al/ZnO:Al targets to deposit the compound layers 15, 39 and 24 of the further inventive examples was varied between 15:2 (Example 4) and 15:8 (Example 9), whereby the atomic ratios of Si:Zn shown in the second column of Table 5 below (as analysed by XPS) were achieved in these layers (as compared to about 2:1 in Examples 1 and 2).

All coated glass panes were heat treated for 5 minutes at 650° C. and the light transmittance and sheet resistance values were measured thereafter. The results are listed in Table 5 below. In the last column the ratio of light transmittance $T_L$ to sheet resistance $R_□$ is displayed. A higher ratio indicates a better low-e/solar control performance of the coating.

TABLE 5

| Example No. | Atomic ratio Si:Zn | $T_L$ [%] | $R_□$ [Ω/□] | $T_L/R_□$ |
|---|---|---|---|---|
| 4 | 3:1 | 84.5 | 2.48 | 34.1 |
| 5 | 1.9:1 | 84.3 | 2.41 | 35.0 |
| 6 | 1.3:1 | 84.8 | 2.31 | 36.7 |
| 7 | 1.1:1 | 85.4 | 2.29 | 37.3 |
| 8 | 1:1.2 | 85.6 | 2.22 | 38.6 |
| 9 | 1:1.7 | 82.1 | 2.07 | 39.7 |
| Comp. 10 | pure Si nitride | 82.1 | 2.80 | 29.4 |

It can be seen from Table 5 that with all inventive coatings (Examples 4-9) a light transmittance clearly above 80% for monolithic glass panes (2.1 mm thick, standard clear float glass with $T_L\approx90\%$) relating to a light transmittance of at least about 75% for laminated glass panes comprising two 2.1 mm thick clear float glass panes (one of which being coated according to the invention) and a transparent interlayer of, e.g., PVB can be achieved, the sheet resistance at the same time being at most about 3Ω/□. Both values indicate a good low-e/solar control performance at a high light transmittance. An optimum performance with a very high light transmittance of more than about 80% (for monolithic coated glass panes) can apparently be achieved with coatings which comprise (on 2.1 mm clear float glass having about 90% light transmittance before being coated) compound layers having an atomic ratio Si:Zn of near to 1:1. Haze values significantly below 0.5% were achieved for Examples 4-9 indicating good heat treatability.

Coatings comprising Si nitride layers in place of inventive compound layers delivered comparably modest results, see last row in Table 5 (Comparative Example 10).

Coated glass panes according to the Examples showed only slight changes in appearance (usually expressed in terms of ΔE*, Δa* and Δb*, both in reflection and transmission) following a heat treatment. Their mechanical and chemical robustness was excellent.

The values stated for the light transmittance $T_L$ of the coated glass panes were derived from measurements according to CIE (1931) illuminant C, 2° observer. The sheet resistance was measured using a NAGY SRM-12 non-contact sheet resistance meter.

The haze values designate the percentage of transmitted light which in passing through the coated glass pane deviates from the incident beam direction by forward scattering (measured in accordance with ASTM D 1003-92). A haze value which remains low during a heat treatment is a good indicator for heat treatability.

The invention claimed is:

1. Coated glass pane with a low-e and/or solar control coating comprising at least one layer sequence which comprises at least the following transparent layers:
   a lower anti-reflection layer;
   an IR-reflecting layer;
   an upper anti-reflection layer; and
   at least one of the anti-reflection layers comprising at least one compound layer containing a mixture of ZnO and at least one of an (oxy)nitride of Si and an (oxy)nitride of Al.

2. Coated glass pane according to claim 1, wherein the compound layer is an essentially homogeneous layer.

3. Coated glass pane according to claim 1, wherein the compound layer has a graded composition such that a ratio of (oxy)nitride of Si and/or (oxy)nitride of Al to ZnO varies significantly across its thickness.

4. Coated glass pane according to claim 3, wherein the ratio of (oxy)nitride of Si and/or (oxy)nitride of Al to ZnO increases and decreases repeatedly across the thickness of the compound layer.

5. Coated glass pane according to claim 1, wherein a mean atomic ratio of (oxy)nitride of Si and/or (oxy)nitride of Al to ZnO in the compound layer, expressed in terms of the ratio of Si and/or Al atoms to Zn atoms, is between 20 : 1 and 1 : 20.

6. Coated glass pane according to claim 1, wherein the compound layer containing a mixture of an (oxy)nitride of Si and/or an (oxy)nitride of Al and of ZnO has a thickness of 10-60 nm.

7. Coated glass pane according to claim 1, wherein a growth promoting layer is provided below the IR-reflecting layer as an upper part of the lower anti-reflection layer.

8. Coated glass pane according to claim 7, wherein the growth promoting layer comprises one or more of ZnO, metal-doped ZnO, metal-doped In oxide, a mixture of an (oxy)nitride of Al and of ZnO, Zn-Si oxide.

9. Coated glass pane according to claim 8, wherein the growth promoting layer comprises Al-doped and/or Sn-doped ZnO or Sn-doped In oxide (ITO).

10. Coated glass pane according to claim 7, wherein the growth promoting layer has a thickness between 2 and 20 nm.

11. Coated glass pane according to claim 1, wherein a barrier layer is provided between the IR-reflecting layer and the upper anti-reflection layer.

12. Coated glass pane according to claim 11, wherein the barrier layer comprises one or more of Ti, $TiO_x$, metal-doped ZnO, Sn-doped In oxide (ITO), Zn-Si oxide, where $x$ is less than, equal to or greater than 2.

13. Coated glass pane according to claim 12, wherein the barrier layer comprises either a layer of $TiO_x$ and a subsequent layer of metal-doped ZnO or a mixed layer comprising both $TiO_x$ and metal-doped ZnO.

14. Coated glass pane according to claim 13, wherein the metal-doped ZnO consists essentially of Al-doped ZnO.

15. Coated glass pane according to claim 11, wherein the barrier layer has a thickness between 0.5 and 15 nm.

16. Coated glass pane according to claim 1, wherein each of the anti-reflection layers comprises a compound layer containing a mixture of an (oxy)nitride of Si and/or an (oxy)nitride of Al and of ZnO.

17. Coated glass pane according to claim 1, wherein at least one of the anti-reflection layers comprises at least one layer which comprises one or more of Zn-Si oxide, Zn-Sn oxide (e.g. zinc stannate), Si (oxy)nitride, Al (oxy)nitride, In-Sn oxide (ITO), Bi oxide, Sn-Si oxide, Bi-Sn oxide, Ti oxide ($TiO_2$).

18. Coated glass pane according to claim 1, wherein the IR-reflecting layer comprises silver or a silver-based alloy.

19. Coated glass pane according to claim 18, wherein the IR-reflecting layer has a thickness of 6-20 nm.

20. Coated glass pane according to claim 1, wherein at least two of said sequences of layers are provided, wherein an optional barrier layer and the upper anti-reflection layer of one sequence of layers is combined with the lower anti-reflection layer, optionally including a growth promoting layer, of a subsequent sequence of layers so as to provide a spacer layer between the two IR-reflecting layers of said sequences of layers.

21. Coated glass pane according to claim 20, wherein the spacer layer comprises a compound layer containing a mixture of an (oxy)nitride of Si and/or an (oxy)nitride of Al and of ZnO with a thickness of 10-120 nm.

22. Coated glass pane according to claim 20, wherein each of the anti-reflection layers and spacer layer(s) comprises a compound layer containing a mixture of an (oxy)nitride of Si and/or an (oxy)nitride of Al and of ZnO.

23. Coated glass pane according to any of claim 20, wherein each IR-reflecting layer comprises silver or a silver-based alloy and has a thickness of 6-15 nm.

24. Heat treated coated glass pane with a solar control and/or low-e coating according to claim 1, which has a haze value of less than 0.5%.

25. Laminated glass pane comprising at least one heat treated coated glass pane according to claim 1, at least one adhesive plastic interlayer, optionally at least one further glass or plastic pane, and wherein the coating of the heat treated coated glass pane faces the interlayer.

26. Coated glass pane according to claim 1, wherein the coated glass pane is an automotive glazing.

27. Coated glass pane according to claim 1, wherein the coated glass pane is a building glazing.

28. Process for the production of a heat treated coated glass pane wherein a coated glass pane according to claim 1 is heat treated for 1-10 min. at 580-690° C. and thereafter bent and/or toughened.

29. Coated glass pane according to claim 1, wherein the compound layer containing a mixture of an (oxy)nitride of Si and/or an (oxy)nitride of Al and of ZnO has a thickness of 25-40 nm.

30. Coated glass pane according to claim 7, wherein the growth promoting layer has a thickness between 4 and 18 nm.

31. Coated glass pane according to claim 11, wherein the barrier layer has a thickness between 1 and 10 nm.

32. Coated glass pane according to claim 18, wherein the IR-reflecting layer has a thickness of 6-15 nm.

33. Coated glass pane according to any of claim 20, wherein the spacer layer comprises a compound layer containing a mixture of an (oxy)nitride of Si and/or an (oxy)nitride of Al and of ZnO with a thickness of 25-90 nm.

34. Heat treated coated glass pane with a solar control and/or low-e coating according to claim 1, which has a haze value of at most 0.3%.

35. Coated glass pane according to claim 1, wherein a mean atomic ratio of (oxy)nitride of Si and/or (oxy)nitride of Al to ZnO in the compound layer, expressed in terms of the ratio of Si and/or Al atoms to Zn atoms, is between 10 : 1 and 1 : 10.

36. Coated glass pane according to claim 1, wherein a mean atomic ratio of (oxy)nitride of Si and/or (oxy)nitride of Al to ZnO in the compound layer, expressed in terms of the ratio of Si and/or Al atoms to Zn atoms, is between 5 : 1 and 1 : 5.

* * * * *